(12) United States Patent
Fox

(10) Patent No.: US 11,092,212 B2
(45) Date of Patent: Aug. 17, 2021

(54) WIRE STRAINERS

(71) Applicant: RURAL INNOVATIONS PTY LTD, Tingalpa (AU)

(72) Inventor: Richard Thomas Fox, Tingalpa (AU)

(73) Assignee: RURAL INNOVATIONS PTY LTD, Tingalpa (AU)

( * ) Notice: Subject to any disclaimer, the term of this patent is extended or adjusted under 35 U.S.C. 154(b) by 220 days.

(21) Appl. No.: 16/349,839

(22) PCT Filed: Nov. 13, 2017

(86) PCT No.: PCT/AU2017/051240
§ 371 (c)(1),
(2) Date: May 14, 2019

(87) PCT Pub. No.: WO2018/090079
PCT Pub. Date: May 24, 2018

(65) Prior Publication Data
US 2020/0056678 A1 Feb. 20, 2020

(30) Foreign Application Priority Data

Nov. 15, 2016 (AU) .................................. 2016904655
Jan. 25, 2017 (AU) .................................. 2017900219
Jul. 7, 2017 (AU) .................................. 2017902659

(51) Int. Cl.
*F16G 11/12* (2006.01)
*B25B 25/00* (2006.01)
(Continued)

(52) U.S. Cl.
CPC .............. *F16G 11/12* (2013.01); *B25B 25/00* (2013.01); *B65H 59/22* (2013.01); *E04H 17/266* (2013.01); *F16G 11/10* (2013.01)

(58) Field of Classification Search
CPC ... B66D 1/06; B66D 1/30; B66D 3/02; B66D 3/14; B25B 25/00; E04H 17/268; E04H 17/266; F16G 11/12; B65H 59/22
See application file for complete search history.

(56) References Cited

U.S. PATENT DOCUMENTS

| 403,620 A | * | 5/1889 | Stiles ...................... F16G 3/006 |
| | | | 254/221 |
| 765,190 A | * | 7/1904 | Moyers ................... B60P 7/083 |
| | | | 254/218 |

(Continued)

FOREIGN PATENT DOCUMENTS

| AU | 2008203804 A1 | 2/2009 |
| EP | 0485034 A1 | 5/1992 |
| GB | 616270 A * | 1/1949 .............. F16G 11/12 |

OTHER PUBLICATIONS

International Search Report/Written Opinion of PCT/AU2017/051240 dated Feb. 13, 2018.

*Primary Examiner* — Emmanuel M Marcelo
(74) *Attorney, Agent, or Firm* — Abelman, Frayne & Schwab

(57) ABSTRACT

A wire strainer including a drive means having a mounting block with a drum mounted for rotation relative thereto, and an actuation means connected to the drum for selectively causing the drum to rotate relative to the mounting block. A line member is operatively connected to the drum in a manner such that rotation of the drum in one direction causes the drum to pull the line member relative to the mounting block. Locking means is operatively connected to the mounting block and adapted to selectively lock the drum against rotation in the opposite direction. Gripping means is operatively connected to the mounting block, wherein the gripping means is adapted to be releasably attached to a wire to be strained. The line member includes securing means for (Continued)

releasably securing the line member to a strainer post or similar anchor.

19 Claims, 6 Drawing Sheets

(51) Int. Cl.
*B65H 59/22* (2006.01)
*E04H 17/26* (2006.01)
*F16G 11/10* (2006.01)

(56) References Cited

U.S. PATENT DOCUMENTS

| | | | | | |
|---|---|---|---|---|---|
| 1,481,424 | A | * | 1/1924 | King | F16G 11/12 |
| | | | | | 254/219 |
| 1,506,842 | A | * | 9/1924 | King | F16G 11/12 |
| | | | | | 254/213 |
| 2,039,693 | A | * | 5/1936 | Verschelden | F16G 11/12 |
| | | | | | 254/223 |
| 2,386,751 | A | * | 10/1945 | Sayles | F16G 11/12 |
| | | | | | 242/419 |
| 2,634,093 | A | * | 4/1953 | Hays | F16G 11/12 |
| | | | | | 254/213 |
| 3,108,785 | A | * | 10/1963 | Slinden | F16G 11/12 |
| | | | | | 254/222 |
| 3,337,927 | A | * | 8/1967 | Dresie | B21F 9/002 |
| | | | | | 24/132 R |
| 6,178,603 | B1 | * | 1/2001 | Lillig | B25B 25/00 |
| | | | | | 24/132 R |
| 2002/0063247 | A1 | * | 5/2002 | Terzaghi | F16G 11/12 |
| | | | | | 254/222 |

* cited by examiner

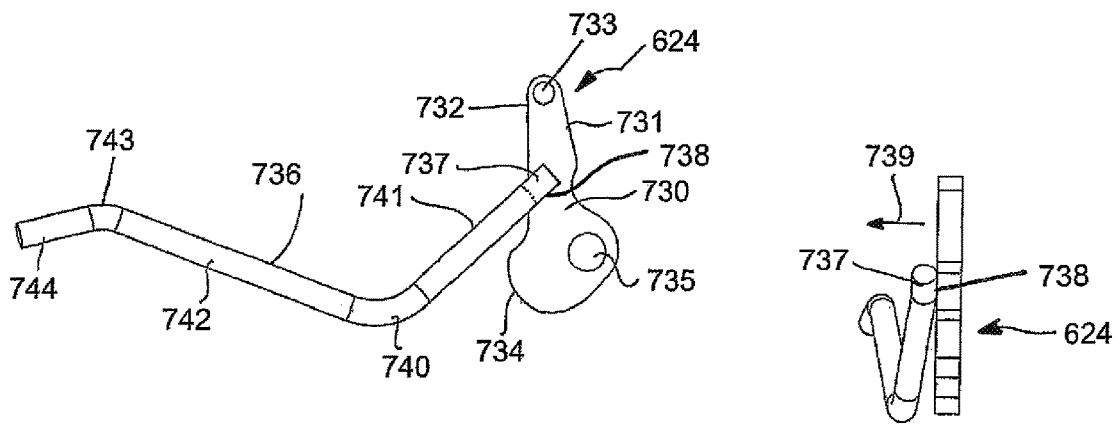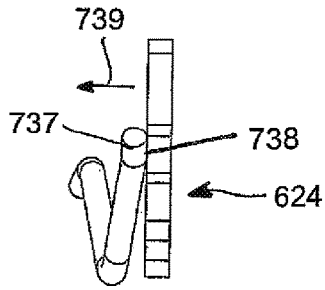
Fig. 21
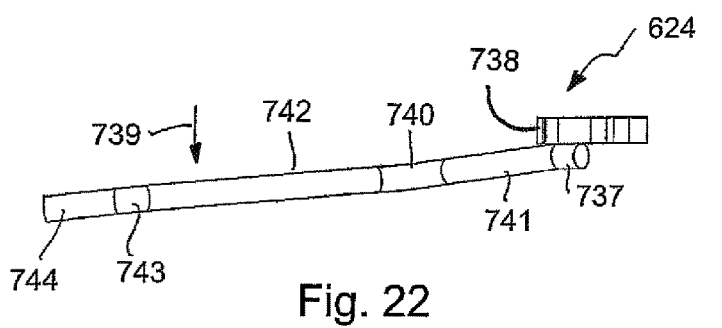
Fig. 22
Fig. 23
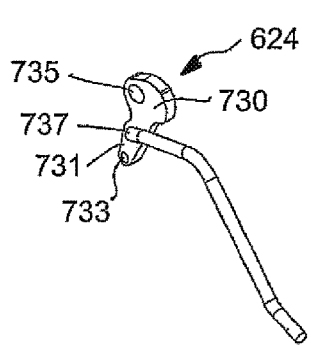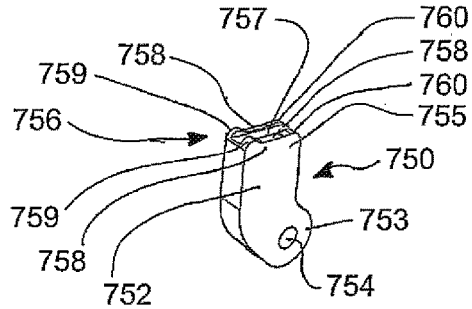
Fig. 24
Fig. 25
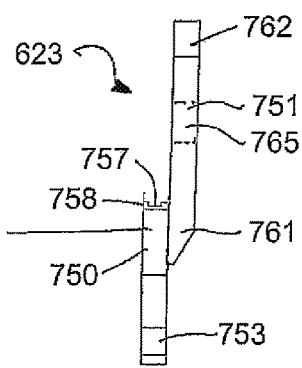
Fig. 26

WIRE STRAINERS

CROSS REFERENCE TO RELATED APPLICATION

This application claims the benefit under 35 U.S.C. § 371 to international application No. PCT/AU2017/051240, filed on Nov. 13, 2017, which claims priority to Australian application nos. AU 2017902659, filed Jul. 7, 2018, AU 2017900219, filed Jan. 25, 2017, and AU 2016904655, filed Nov. 15, 2016, the contents of which are incorporated by reference herein in their entireties.

This invention relates to wire strainers and in particular wire strainers for straining fence wires in rural fencing and reference will be made to such application. However, the invention may have application in other fields.

A number of different types of wire strainers presently exist. One type has three gripping mechanisms suitably adapted to grip plain wire and can be used directly with the wire to be strained if it is a plain wire or with an auxiliary plain wire where barbed wire has to be strained. In use, the auxiliary wire is secured to a strainer post or some other suitable straining anchor and one of the grippers is attached to the wire to be strained in a predetermined fixed position and the other two grippers are attached to the auxiliary wire in spaced apart movable positions. The three gripping mechanisms are connected to a lever in a manner such that movement of the lever in one direction moves one of the movable grippers along the auxiliary wire and movement in the other direction moves the other movable gripper in the same direction along the auxiliary wire so that the two auxiliary grippers alternately grip then release and move as the lever is moved back and forth thereby pulling the wire to be strained towards the strainer post or other anchor as the case may be.

In cases where wire strainers of this type are used directly with the wire to be strained, the movable grippers can be attached to the wire to be strained and the fixed gripper can be attached to an auxiliary wire which itself is fixed to the strainer post or other suitable anchor. However, the grippers often cause damage to the wire by removing the galvanising at the point of attachment and in some cases by causing indentations which can cause stress points and breaking of the wire months or even years later.

In this type of wire strainer, the grippers include two gripper jaws connected to each other for pivoting movement relative about a pivot pin between an open position in which the wire can be placed between the gripper jaws ("the loading position") and a closed position in which the gripper jaws are closed about and grip the wire ("the gripping position" or "straining position"). The two grippers are biased to the gripping position by a spring member connected thereto which is typically a substantially V-shaped wire or bar spring arranged such that the free ends are biased outwards away from each other to hold the grippers in the gripping position, that is, with the grippers in the closed position. Such wire strainers typically have a small handle extending from one gripper jaw substantially perpendicular in use to the wire being strained.

Another type of wire strainer uses an auxiliary chain instead of an auxiliary plain wire and the two auxiliary grippers are arranged to engage with spaced apart links of the auxiliary chain. One of the problems with that arrangement is that the minimum movement of the wire is at least two links of the chain because the chain grippers are arranged to grip links in the same plane thereby restricting gripping to alternate links and the grippers themselves would interfere with each other even if it were possible to grip adjacent links. Consequently, such wire strainers can result in under straining or over straining of different sized or types of wires or at least variations in the strain applied to different wires in the same fence.

In both types of wire strainer, the fixed gripper typically includes two jaw members which engage the wire therebetween in a manner such that the jaw members tighten on the wire as the strain on the wire increases. While that mechanism is generally satisfactory, sometimes it is difficult to open and close the jaws in the desired position on the wire. Some of the difficulty arises because of the awkwardness of holding the lever mechanism in position on the auxiliary chain or the auxiliary wire with one hand while working the jaw mechanism with the other.

The present invention is aimed at ameliorating to some extent one or more of the aforementioned problems and at least providing a wire strainer which is reliable and efficient in use.

With the foregoing in view, the invention in one aspect resides broadly in a wire strainer including:

drive means comprising a mounting block with a drum mounted for rotation relative thereto and actuation means connected to the drum for selectively causing the drum to rotate relative to the mounting block, and a line member operatively connected to the drum in a manner whereby rotation of the drum in one direction causes the drum to pull the line member relative to the mounting block, and locking means for selectively locking the drum against rotation in the opposite direction, the actuation means and the locking means being selected to provide a predetermined mechanical advantage;

first gripping means operatively connected to the block of said drive means and adapted to be releasably attached to a wire to be strained; and said line member including securing means for releasably securing said line member to a strainer post or similar anchor.

In another aspect, the invention resides broadly in a wire strainer including:

drive means comprising a mounting block with a drum mounted for rotation relative thereto and actuation means connected to the drum for selectively causing the drum to rotate relative to the mounting block, and a line member operatively connected to the drum in a manner whereby rotation of the drum in one direction causes the drum to pull the line member relative to the mounting block, and locking means for selectively locking the drum against rotation in the opposite direction;

first gripping means operatively connected to the block of said drive means and adapted to be releasably attached to a wire to be strained;

said line member including securing means for releasably securing said line member to a strainer post or similar anchor;

wherein said drive means is selected such that said locking means may lock said drum in any selected one of a plurality of locking positions upon rotation of said drum by said actuation means and wherein adjacent ones of said plurality of locking positions are relatively small when compared to the prior art strainers referred to earlier in this specification.

Preferably, the line member is a chain and the securing means is a hook attached to a link of the chain and adapted to hook around the chain or to a link in the chain to thereby form a closed loop around a strainer post. However, other line members such as a cable strap, rope or the like may be used if desired.

It is also preferred that a second gripping means be provided at the other end of the line member to allow the wire strainer to be used in an in line situation where two wires are to be strained together.

In a simple mechanical embodiment, the actuating means includes an actuating lever arranged to engage the drum or a shaft extending from the drum and cause it to rotate or pivot about the drum axis. In one such embodiment the drum or shaft has a sprocket or a gear secured thereto or formed therewith and the actuating lever includes a pawl which is arranged to engage a tooth or cog thereon so as to cause the drum to rotate upon movement of the actuating lever relative to the block. In such form, it is preferred that the locking means be a similar pawl arranged to engage another tooth or cog for locking the sprocket or gear against reverse rotation thereby allowing the actuating lever to operate the drum in a ratchet and pawl manner.

Advantageously, the diameter of the drum (or at least the pitch circle of the drum, that is, the circle upon which the line member is centred) and the length of the actuating lever are selected to allow an average worker to easily operate the wire strainer for straining normal farm fencing wire including high tensile fencing wire. Importantly, in a direct drive arrangement the number of teeth on the sprocket determine the minimum arc which may be "locked" and therefore the minimum strain which may be put on the wire in any lever movement. For example, a sprocket with 360 teeth allows the actuating lever to travel through a minimum arc of one degree before it can be locked by the locking pawl while a sprocket with 90 teeth will have a minimum of four degrees arc before it can be locked.

The inventor has found that an actuating lever length of between about 150 mm and about 250 mm combined with a drum having a pitch circle diameter of between 25 mm and 50 mm with the locking mechanism arranged to allow increments of less than 30 degrees provides a wire strainer of an easily manageable size which can be operated by an average fencer and allow the wires to be efficiently strained without overstraining. Further, such a wire strainer may be easily carried on a quad bike, a farm bike or even a horse thereby allowing a farmer or stockman to carry pliers and strainers at all times on a property and fix a fence as he sees a problem. A small gauge chain is also preferred of at least 3.0 mm, more preferably about 3.2 mm gauge.

While a drum of larger pitch circle diameter may be selected, the actuating lever will need to be longer and the minimum arc will have to be decreased to achieve the desired benefit of inhibiting overstraining.

It will be appreciated that care must be taken when using any wire strainer with barbed wire, especially modern barbed wire which has bigger and sharper barbs than older styles. With that in view, it is preferred that the first gripping means be separated from the block by a distance which puts the barbed wire gripped thereby beyond the actuating handle or any other actuating means where an operator's hands need to be placed from time to time. In the preferred forms previously mentioned, it is preferred that the gripping means be connected to the block by a rigid connecting member adapted to hold it away from the block by a predetermined distance selected by reference to the actuating means and in the case of an actuating lever, the length of the actuating lever and the possible position of the user's hands when operating the actuating lever. It is also preferred that the actuating lever include a handle portion and that the actuating lever be suitably shaped to space the handle portion laterally from the drum, that is, sideways in use from the running direction of the wire to be strained. It also will be seen that the wire strainer may be attached to the wire at the appropriate orientation—that is, at a swivel angle about the wire—for convenience of operation.

In another embodiment of the invention, the actuating means includes an electric motor instead of the actuating lever operatively connected to the drum for causing it to rotate. In such form of the invention the electric motor includes an adjustable clutch which can be used to preset the strain to be applied to the wire to be strained. Such a clutch can be incorporated in the actuating lever action version also if desired. Motor attachment means may be provided to effect this embodiment and may include arrangements for connecting electrically operated hand tools, such as an electric drill or the like. The electrically operated hand tools may be cordless.

Preferably, the first gripping means is arranged to swivel about a longitudinal axis extending in the direction of the wire run so as to allow the wire to rotate about its longitudinal axis as strain is applied.

It is also preferred that the first gripping means includes two jaw members adapted to tighten onto the wire as the strain increases in much the same way as mentioned previously in relation to the prior art strainers but further including biasing means for biasing the jaw members towards the closed position. In a preferred form the biasing means includes a torsion spring arranged to engage both jaws to bias them to the closed position.

Preferably the wire strainer includes a tension indicating device or a tension gauge by which an operator can gain an indication of the tension in the wire being strained. In one form of the invention, the tension gauge is mounted between the drive means and the first gripping means. In such form, the tension gauge includes a spring mounted in a housing such that the spring is operatively connected at one end to the drive means and at the other end to the first gripping means such that tension on the spring moves a visible indicator relative to the housing. In another form, a similar device is mounted in the line member in a suitable position which does not interfere with the line member being mounted to a strainer post. In yet another form, the tension gauge includes a clock spring mounted in the handle with a similar visible indicator.

In another aspect, the invention resides broadly in a wire strainer including:

drive means comprising a mounting block with a drum mounted for rotation relative thereto and actuation means connected to the drum for selectively causing the rotary drum to rotate relative to the mounting block, and a line member operatively connected to the drum in a manner whereby rotation of the drum in one direction causes the drum to pull the line member relative to the mounting block, and locking means for selectively locking the drum against rotation in the opposite direction;

first gripping means operatively connected to the block of said drive means and adapted to be releasably attached to a wire to be strained;

said line member including securing means for releasably securing said line member to a strainer post or similar anchor;

wherein said first gripping means includes two opposed jaw members connected to each other for pivoting movement relative to each other between an open position in which a wire to be strained can be placed therebetween and a closed (or gripping) position in which the wire to be strained is gripped between said jaw members, said jaw members being biased to the closed position by spring means, said spring means having two elongate portions with spaced apart free ends connected to said opposed jaw members respectively, said first gripping means further including a release lever extending from one or the other of said jaw members and at least a portion of said release lever extending generally in the direction of the wire being strained whereby a user may grip said release lever and one of said elongate portions in one hand to squeeze said one portion and said release lever towards each other or together.

In yet another aspect, the invention resides broadly in a wire gripping component for a wire strainer for releasably gripping a wire to be strained, including:

two opposed jaw members connected to each other for pivoting movement relative to each other between an open position in which a wire to be strained can be placed therebetween and a closed (or gripping) position in which the wire to be strained is gripped between said jaw members;

biasing means for biasing said jaw members to the closed position, said biasing means including two elongate portions of resilient material, said two elongate portions having spaced apart free ends connected to said opposed jaw members respectively and said two elongate connecting portions being connected to each other by a biasing portion biasing the free ends towards each other;

a release lever extending from one or the other of said jaw members and at least a portion of said release lever extending generally in the direction of the wire being strained whereby a user may grip said release lever and one of said elongate portions in one hand to squeeze said one portion and said release lever together so as to move said jaw members from the closed position to the open position against the bias of said biasing means.

Preferably, said spring means includes a substantially U- or V-shaped spring wire or bar and said two elongate portions are two legs which form said U- or V-shape. In a specially preferred form, said legs diverge away from an apex to their respective free ends in the strained position, but are relatively parallel when unstrained. That is to say, the legs extend from a coil formed by turning spring wire through angle of up to about 540°. In such form it is preferred that the legs be substantially symmetrical about a longitudinal axis through said apex which in use extends substantially in the direction of the wire being strained. It is also preferred that said release lever or at least a gripping portion of said release lever extend substantially in the direction of said longitudinal axis. When strained to the rest position in the gripper links, the spring has a nominal force of about 3 to 4 kg at the free ends. As a result, the end of the handle portion of the release lever requires a force of about 1 kg to open the jaws, further opening the spring.

Preferably, said drive means is as hereinbefore or hereinafter described.

In order that the invention may be more clearly understood and put into practical effect, reference will now be made to the accompanying drawings wherein:

FIG. 21 is a front view of a first gripper link of the gripping means shown in FIGS. 17 to 20;

FIG. 22 is a plan view of the first gripper link shown in FIG. 21;

FIG. 23 is an end view of the first gripper link shown in FIG. 21;

FIG. 24 is an isometric view of the first gripper link shown in FIG. 21;

FIG. 25 is an isometric view of a second gripper link of the gripping means shown in FIGS. 17 to 20;

FIG. 26 is an end view of the second gripper link shown in FIGS. 17 to 20;

Figure 1:
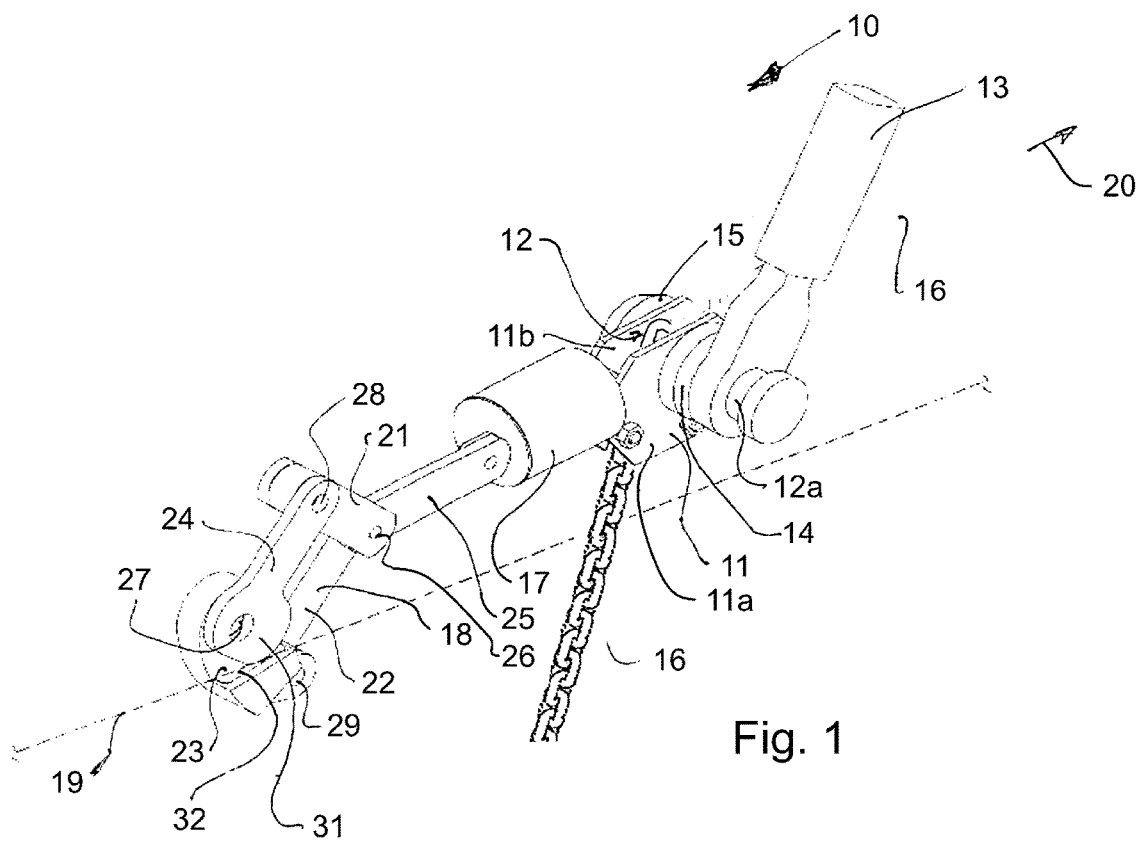
FIG. 1 is an isometric view of a wire strainer according to the invention.
Figure 2:
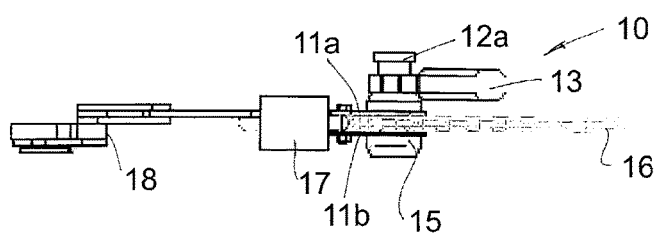
FIG. 2 is a plan view of the wire strainer of FIG. 1.
Figure 3:
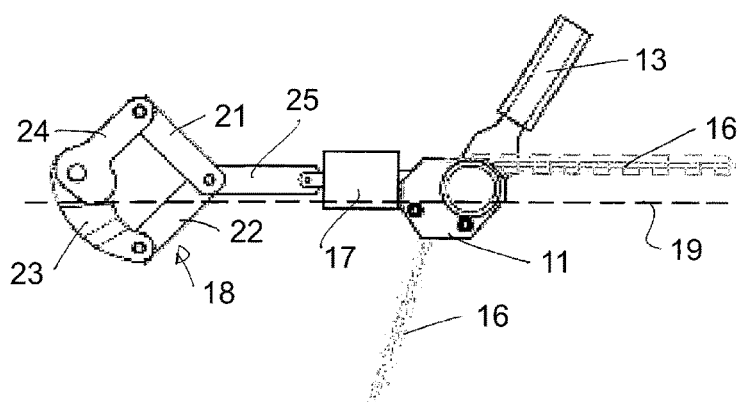
FIG. 3 is a side view of the wire strainer of FIG. 1.
Figure 4:
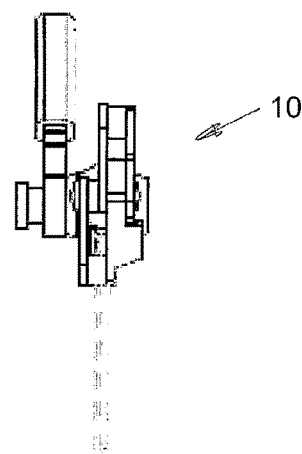
FIG. 4 is a front view of the wire strainer of FIG. 1.

The wire strainer 10 illustrated in FIG. 1 includes a mounting block 11 which includes two outer housing plates 11*a* and 11*b* and a drum 12 mounted therebetween for rotation relative thereto. A driveshaft 12*a* extends from one end of the drum and an actuating lever or drive handle 13 is mounted on the driveshaft 12*a* and arranged to rotate the shaft and the drum connected thereto via a ratchet mechanism 14 and a variable clutch 15.

A chain 16 is connected to the drum in a manner which allows rotation of the drum to effectively pull the mounting block in the direction of arrow 20 along the chain towards the post to which the chain is secured. Suitably, the drum has recesses therein to accept individual chain links and hold them on the drum whereby the chain passes over the drum but does not roll onto the drum.

A tension indicating device or tension indicator 17 is connected to the mounting block and a wire gripping device or wire gripper 18 in turn is connected to the tension indicating device and the wire gripper in turn grips the wire 19 to be tensioned. In this case, the length of the actuating lever is 300 mm and pitch circle diameter of the drum where the chain engages is 30 mm and the ratchet sprocket provides for a minimum arc of the handle 13 through 10 degrees.

The wire gripper 18 operates effectively under a parallelogram action which is achieved by two pairs of opposed links 21 and 23 and 22 and 24 with adjacent links being pivotally connected to each other. That is to say, operator links 21 and 22 are pivotally connected to each other at one end by a pivot pin 26 and to a connector link 25 which connects the wire gripper to the tension indicator 17. Similarly, the gripper links 23 and 24 which grip the wire to be strained are pivotally connected to each other at one end by a pivot pin 27 and in turn the gripper link, or lobe link 24 is pivotally connected to the operator link 21 at its other end by a pivot pin 28 and similarly the gripper link 23 is connected to the operator link 22 by a pivot pin 29.

The gripper link 24 includes a lobe 31 adjacent the pivot pin 27 which is adapted to engage the wire and force it against the face 32 of a shoulder 33 as the tension in the wire increases by virtue of the parallelogram action of the four links. Suitably, the lobe and the shoulder are so made and arranged that the lobe barely engages the shoulder when no wire is placed between the two components.

Figure 5:
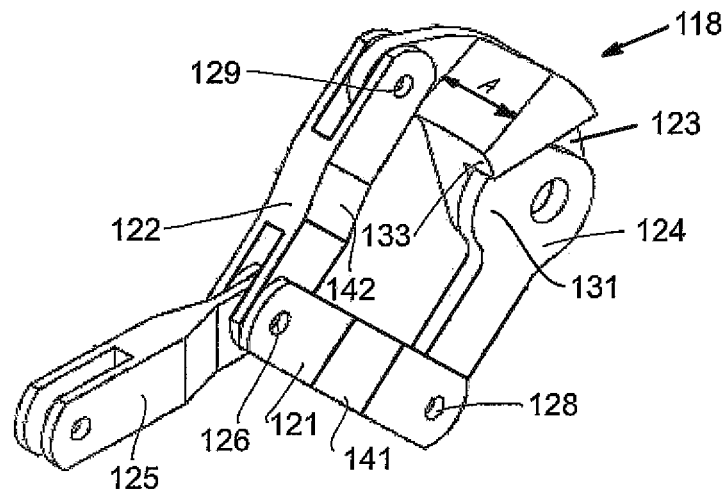
FIG. 5 is an isometric view of a gripping device which may be used as an alternative to the gripping device component shown on the wire strainer of FIG. 1.

The wire gripper component 118 illustrated in FIG. 5 is similar to the wire gripper component 18 shown in FIG. 1 in many respects and accordingly the same reference numbers will be used for corresponding components except prefaced by a "1". Notably, the opposite ends of the operator link 121 are offset, that is not aligned as they are in relation to the gripper previously described by virtue of a bend 141 therein. Similarly, the opposite ends of the operator link 122 are offset but they are offset in the opposite direction with the result that the lobe link 124 is laterally spaced from operator link 122 by a significantly greater distance thereby allowing the lobe 131 and the shoulder 133 to be offset out of the line of the connector link 125 with the advantage that the wire 19 is offset further from the block 11, the handle 13 and the tension indicator 17. This is particularly important when the wire strainer is being used with barbed wire.

Figure 6:
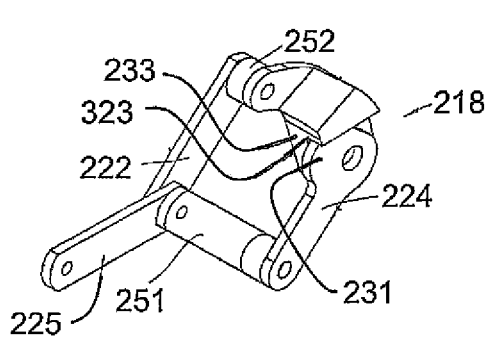
FIG. 6 is another alternative gripping device component.

The wire gripper component 218 illustrated in FIG. 6 also is similar to the wire gripper component 18 shown in FIG. 1 in many respects and accordingly the same reference numbers will be used for corresponding components except prefaced by a "2". In this case, lobe link 224 is spaced further from the connector link 225 by virtue of a spacer sleeve 251 and similarly the other gripper link 233 is spaced from the operator link 222 in the same direction by use of a spacer sleeve 252. Advantageously, it will be seen that the shoulder 233 and the lobe 231 are significantly further out of alignment from the connector link 225 making it more suitable for barbed wire with big barbs because the big barbs are less likely to engage with the connector link 225 or become entangled with the hanging part of the chain.

Figure 7:
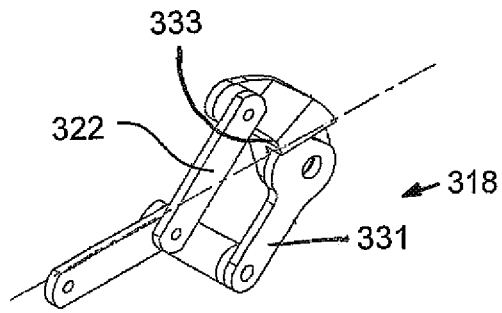
FIG. 7 is another alternative gripping device component shown with the line of the wire to be strained in position.

The wire gripper component 318 illustrated in FIG. 7 is similar to the gripper illustrated in FIG. 6 and the differences are small and will well illustrated so no further description is necessary, the main difference being the location of one of the operator links 333 being mounted to the opposite sides of the connector link and gripper link from that illustrated in FIG. 6.

Figure 8:
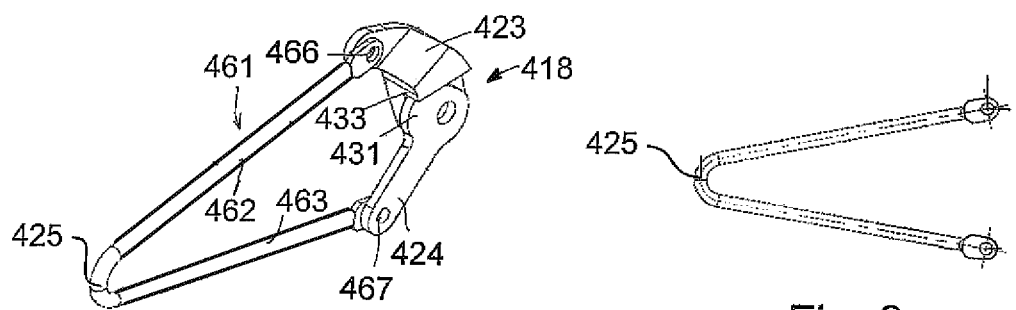
FIG. 8 is an isometric view of another alternative gripping device.
Figure 9:
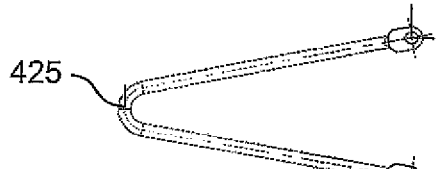
FIG. 9 is a front view of the spring component of the gripping device shown in FIG. 8.

The wire gripper component 418 illustrated in FIG. 8 is similar to the wire grippers previously described and accordingly the same reference numbers will be used for corresponding components except prefaced by a "4" wherever possible. This component includes the two gripper links 423 and 424 but instead of having operator links of the type previously described which operate with the others in a parallelogram action, it has a single biasing link 461 constructed of 6 mm spring steel with two link arms 462 and 463 which diverge from an apex 425 towards the gripper links and are connected thereto via two pivot pins 466 and 467. Advantageously, the arms 462 and 463 are biased inwards towards each other with the effect that the gripper link or lobe link 424 is biased towards the engaged position with gripper link 423. Thus, the gripper can be fitted to the wire and the biasing link 461 holds the wire in the gripper while the operator ties the chain 16 to the post or adjust the clutch or makes other manoeuvres.

Figure 10:
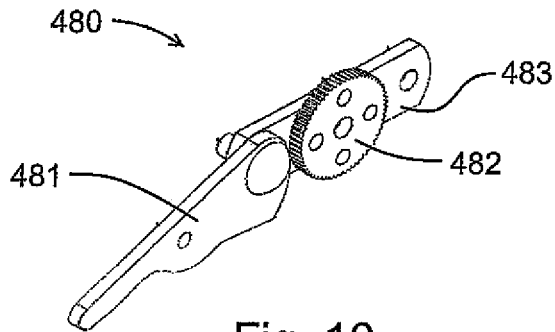
FIG. 10 is an isometric view a wire gripping device according to the prior art.
Figures 11, 12:
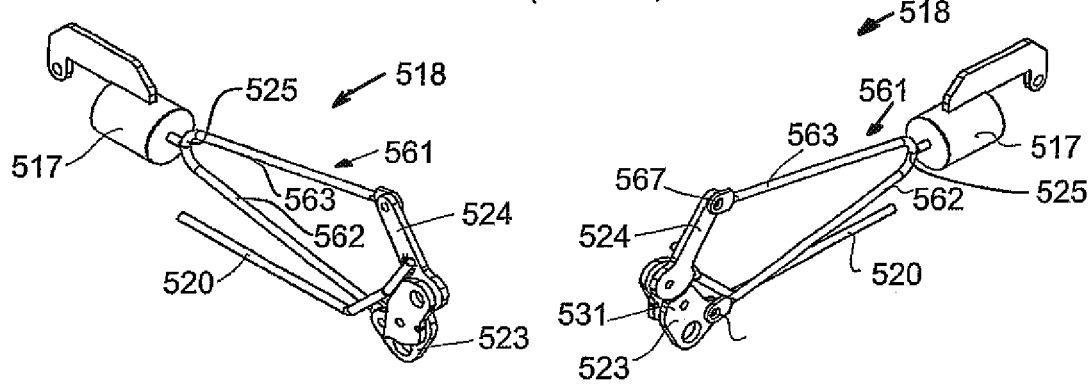
FIG. 11 is an isometric view of an improved wire gripping device from one side.
FIG. 12 is an isometric view of the improved wire gripping device of FIG. 11 from the other side.
Figures 13, 14:
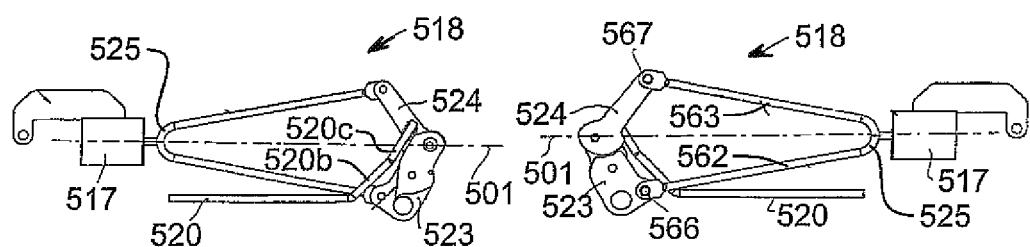
FIG. 13 is a side view of the improved wire strainer of FIG. 11 from one side.
FIG. 14 is a side view of the improved wire strainer of FIG. 11 from the other side.
Figure 15:
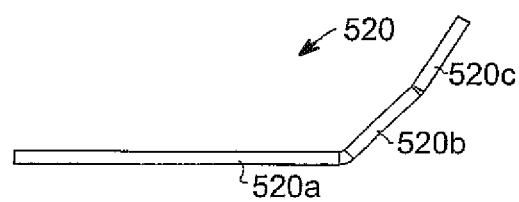
FIG. 15 is a side view of the release lever of the improved wire strainer of FIG. 11.
Figure 16:
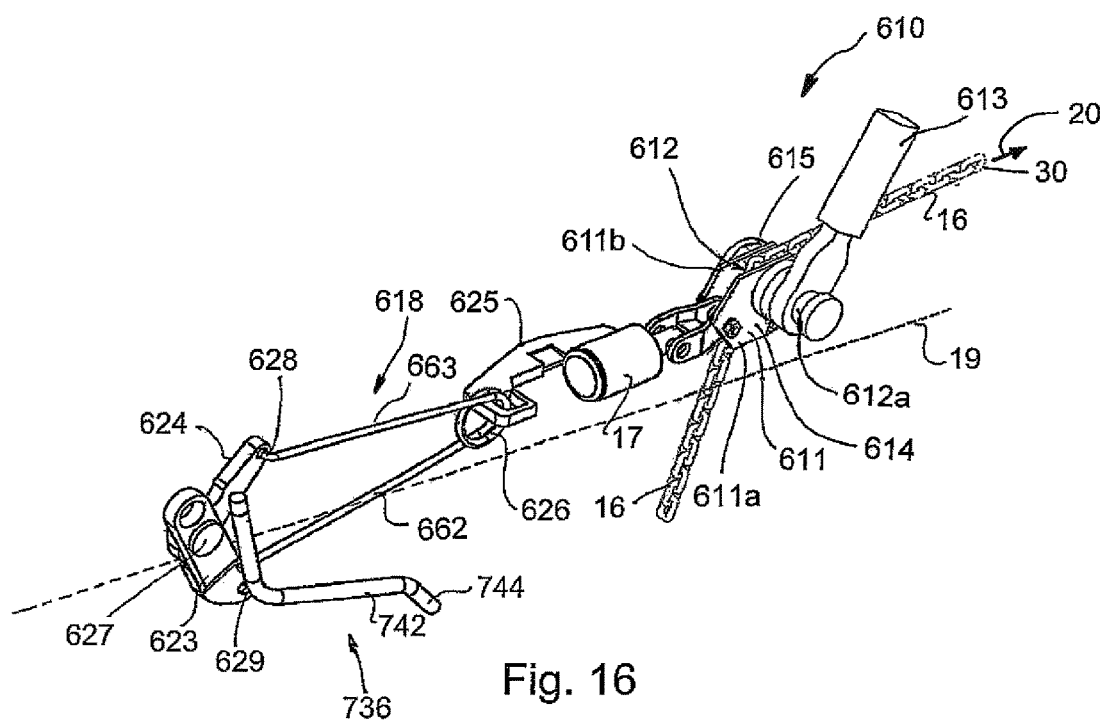
FIG. 16 is an isometric view of a wire strainer constructed in accordance with the present invention.
Figure 17:
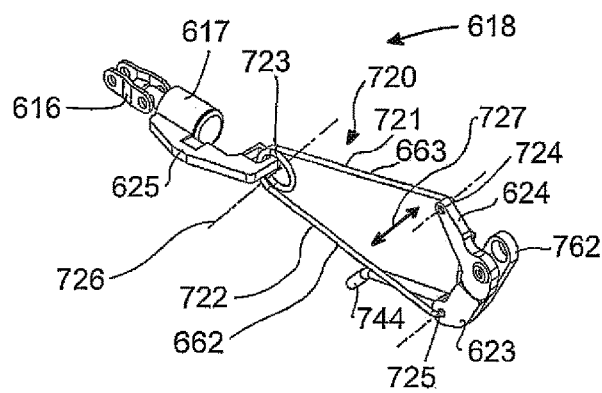
FIG. 17 is an isometric view of gripping means constructed in accordance with the present invention.
Figure 18:
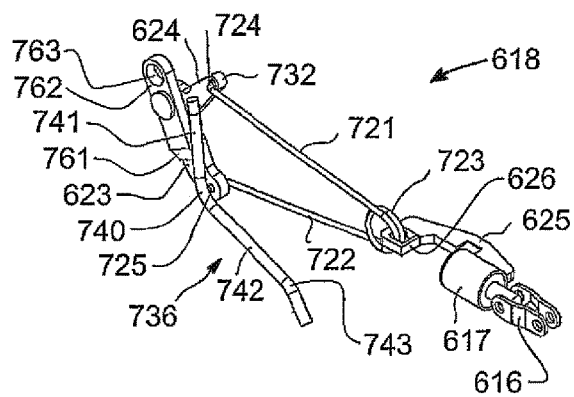
FIG. 18 is an isometric view of the gripping means of FIG. 17 viewed from the opposite end from that shown in FIG. 17.
Figure 19:
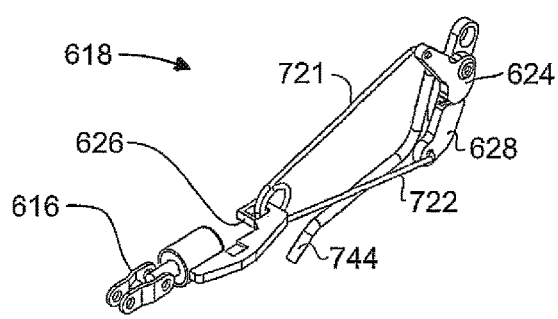
FIG. 19 is an isometric view of the gripping means of FIG. 17 viewed from the opposite side from that shown in FIG. 18.
Figure 20:
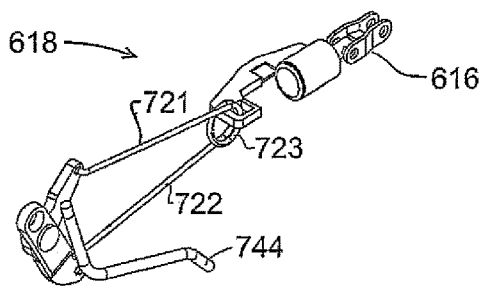
FIG. 20 is an isometric view of the gripping means of FIG. 17 viewed from the opposite side from that shown in FIG. 17.
Figure 27:
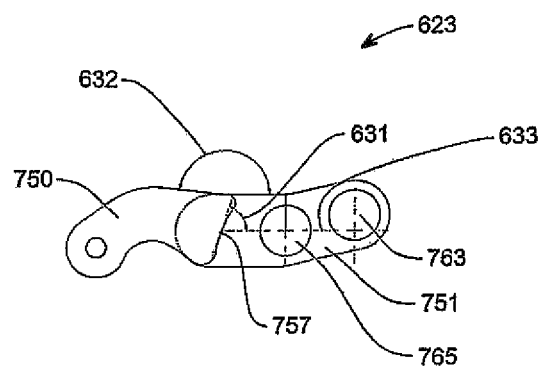
FIG. 27 is an elevation of another second gripper link for the wire strainer according to the invention.
Figure 28:
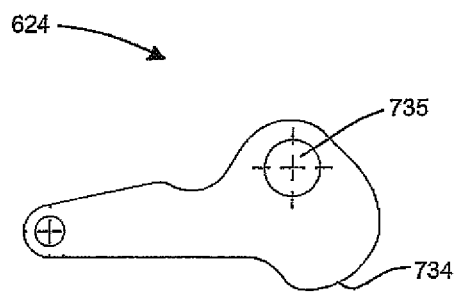
FIG. 28 is an elevation of another first gripper link for the wire strainer according to the invention.
Figure 29:
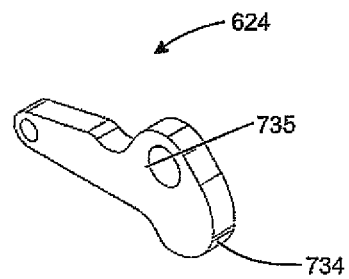
FIG. 29 is a pictorial view of the first gripper link of FIG. 28.

The still yet gripping arrangement of the prior art wire gripping device 480 illustrated in FIG. 10 has a gripper link 481 of older form adapted to engage with a toothed or serrated wheel 482. The toothed or serrated wheel has been found to be detrimental to the wire, causing indentations which can increase the likelihood of corrosion of eh wire once the wire strainer has been released. By contrast the gripping arrangement of eh wire strainer according to the present invention has a relatively smooth face.

The improved wire gripper component 518 illustrated in FIGS. 11 to 14 is similar to the wire gripper 418 previously described and accordingly the same reference numbers will be used for corresponding components except prefaced by a "5" instead of a "4" wherever possible. This component includes the two gripper links 523 and 524 which are substantially the same as links 423 and 424 with a single biasing link 561 constructed of spring steel with link arms 562 and 563 which diverge from the apex 525 towards the gripper links and are connected thereto via pivot pins 566 and 567. The link arms are biased inwards towards each other in the same manner as described in relation to component 418. The main difference between the gripper component 518 and the gripper component 418 is that the gripper component 518 includes a release lever 520 which is welded to the gripper link 524 and provides easy operation of the gripper links to open and close the gripping jaws. As can be seen more clearly in FIG. 13, the release lever 520 is more or less parallel to the gripping portion 520a of the release lever and the gripping portion is connected to the gripper link 524 by two connecting portions 520b and 520c which extend end-to-end at an obtuse angle and are arranged to place the gripping portion away from the line of the wire to be strained and to allow room for the operator's hand without interfering with the wire.

Advantageously, an operator is able to grip the release lever 520 and link arm 562 in one hand and move them towards each other. Suitably, such movement causes gripper links 523 and 524 to pivot about their respective pivot pins to move to the open or loading position so that the wire to be strained can be fitted between the jaws. Advantageously, the arrangement allows operation of the gripper component from open to closed and vice versa while holding it in any desired position by one hand thereby allowing the other hand to hold the wire to be strained in position for easy fitting between the gripper jaws. Advantageously, the gripping portion of the jaw members 523 and 524 is offset from the centreline 501 of the biasing link 561 which provides for reduction in overall size while maintaining sufficient gripping force which in turn allows for easier gripping of the release lever and link arm 562. It also provides for reduced motion of the release lever between the open and closed jaw positions as well as an increased wire contact angle by the jaws thereby reducing the possibility of indentation and pinching of the wire being strained. In this embodiment the wire gripper component can be held comfortably in either hand of an operator and the position of the release lever relative to the jaw members allows for good wire visibility and easy operation of the jaw members by the release lever.

The wire strainer 610 illustrated in FIGS. 16 to 29 is similar to the wire gripper 10 illustrated in FIG. 1 as modified by the wire gripper component illustrated in FIGS. 8 to 15 and accordingly the same reference numbers will be used for corresponding components except prefaced by a "6" or "7" wherever possible, including instances where such components are prefaced by a "4" or "5", the "6" or "7" being substituted therefor. The wire strainer 610 includes a mounting block 611 which includes two outer housing plates 611a and 611b and a drum 612 mounted therebetween for rotation relative thereto. A driveshaft 612a extends from one end of the drum and a drive handle or actuating lever 613 is mounted on the driveshaft 612a and arranged to rotate the shaft and the drum connected thereto via a ratchet mechanism 614 and a variable clutch 615. The variable clutch is arranged to slip at a predetermined selected point when the tension in the wire being strained reaches the desired tension.

A chain 16 is connected to the drum in a manner which allows rotation of the drum to effectively pull the mounting block 611 along the chain towards a post, (not shown), to which the chain is secured. Suitably, the drum has recesses therein to accept individual chain links and hold them on the drum whereby the chain passes over the drum but does not roll onto the drum.

The gripper component 618 includes the two gripper links 623 and 624 which are substantially the same as the gripper links 523 and 524 with a single biasing link 720 constructed of spring steel with link arms 662 and 663 which diverge from a coiled loop 723 towards the gripper links and are connected thereto in a manner described hereinafter. The link arms are biased inwards towards each other in the same manner as described in relation to component 518.

FIGS. 17 to 20 show in greater detail the wire gripper component 618 from four different angles. The reference numerals for the parts of the wire gripper are not all included in all drawings because they may be occluded in one or more of the different views or because such inclusion would cause unnecessary cluttering in the drawings. It can be seen that the opposed links 621 and 622 are in effect two arms 721 and 722 respectively of a single biasing link 720 that is constructed from spring steel and whereby the two arms are connected to one another by an intermediate coiled portion 723 comprising one and a half turns of spring steel. The release lever 736 is welded to the gripper link 624 and provides easy operation of the gripper links to open and close the gripping jaws. An adaptor piece 616 allows easy disconnection of the tensioning unit for replacement by a hook so that the drum and chain can be used as a hoisting unit.

A tension indicating device or tension indicator 617 is connected to the mounting block, not shown, and the wire gripping component 618 is connected to the tension indicating device via a connector link 625. The tension indicator is provided with a colour coded plunger to provide readily a visual indication of tension applied to the wire. The biasing link 720 is connected to the connector link 625 via a flap 626 which when closed secures the parts together with a strong connection. The flap is provided by provision of a groove with a V-section in a flat portion, the flap extending straight, but being folded about the base of the groove to an approximate right angle.

The two arms 721 and 722 diverge outwardly away from the intermediate coiled portion 723 and each arm 721 and 722 includes an opposing free end portion 724 and 725 respectively that extends inwardly from said respective arm in a direction that is substantially parallel to the axis of rotation 726 of the coiled intermediate portion 723. The free end portion 724 functions as the pivot pin 628, while the free end portion 725 functions as the pivot pin 629, as foreshadowed in the description of FIG. 16. The free end portions are secured in the gripper links by a standard or grooveless circlip, or by mushrooming of the end. Further, the intermediate coiled portion serves to displace the two arm members 721 and 722 laterally as generally indicated by arrows 727.

FIGS. 21 to 24 show in detail the gripper link 624 which includes a body portion 730 and an arm 731 that is connected to said body portion, said arm 731 having a free end portion 732 in which there is formed an aperture 733 that is adapted to receive therein the free end portion 724. The body portion 730 includes an arcuate gripping face 734 and an aperture 735 for receiving a pivot pin or the like for pivotal connection to the other gripper link 623.

The release lever 736 has a first end portion 737 that is fixed at 738 to one side of the body portion 730 of the gripper link 724 and is arranged such that the release lever diverges laterally away from said body portion in the general direction of arrow 739 as seen more clearly in FIG. 22. The release lever 736 includes a first bend 740 connecting a first portion 741 to a second portion 742, and a second bend 743 connecting the second portion 742 to a third portion, or free end portion, 744.

FIGS. 25 to 29 show in detail the gripper link 623 which includes a first part or gripping member 750, and a second part or arm member 751. The gripping member 750 includes a body portion 752 and a lug 753 in which there is formed an aperture 754. The body portion 752 also includes an end portion 755 in which there is formed a channel 756 having a substantially flat face 757 that is flanked on either side by opposing wall portions 758 that each include a first raised portion 759, located at one end thereof, and a second, somewhat smaller raised portion 760 located at the opposite end thereof. The body portion 752 is fixed to one end 761 of the arm member 751, while the opposing end 762 of the arm member 751 includes an additional aperture 763 formed therein. The arm member 751 also includes a second aperture 765, shown in dotted outline in FIG. 26 penetrating therethrough. The flat face 757 is at an angle 631 of between 72° and 73°, preferably 72.3° to the axis 633. The face outer of the body portion is at an angle 632 of 173.5° to the axis and outer face of the arm member. Thus, it will be seen that the distance between the second aperture 765 and the flat face 757 along the axis 633 is slightly greater that the shortest distance between the second aperture 765 and the flat face.

The additional aperture 763 is provided for connecting the wire strainer to other equipment, such as a pre-fabricated fence wire clamp for clamping pre-fabricated fencing, such as chain wire or the like, to hold the pre-fabricated fence wire in place while tensioning the supporting wires.

The gripper link 624 is pivotally connected to the gripper link 623 by the pivot pin 627 that extends through aligned apertures 735 and 765. The gripper link 624 is pivotally connected to arm 721 by the location of end portion 628 in aperture 733. The gripper link 623 is pivotally connected to arm 722 by the location of end portion 725 in the aperture 629.

In use, the free end 30 of the chain 16 is wrapped around a strainer post or similar anchor, (not shown), and secured thereto. For example, there may be provided a hook connected to the end 30 of the chain and whereby the hook may be used to engage a portion of the chain spaced from the end 30 so as to form a loop around the post that in turn will "choke" the strainer post. The slack in the wire may be taken up quickly by pulling the chain through the block. Once the strain is taken by the block, the clutch engages which allows the ratchet to be operated.

The wire gripper 618 is then secured to the wire 619 that is to be strained or tensioned. In this regard it is to be noted that the gripper links 624 and 623 are, as a consequence of the action of the biasing link 720, biased to a closed, or gripping position, as generally shown in FIGS. 17 to 20. In order to open the gripper links 624 and 623 so as to permit the placement of the wire 619 therebetween, an operator may choose to hold the gripper 618 in one of their hands such that the palm, adjacent the base of the thumb, bears against a mid portion of arm 721 while the fingers press against the second and/or third portions 742 and 744 respectively of the release lever 736. By squeezing together the arm 721 and the release lever 736, the arms 721 and 722 will pivot about the axis 726 of the intermediate coiled portion 723, while the arm 721 and the gripper member will pivot about pin 628, and gripper link 624 will pivot relative to gripper link 623 about pivot pin 627.

The wire is then positioned in the channel 756 and is retained therein by the opposing wall portions 758, and in particular by the opposing guides 759. The arcuate gripping face 734 of the other gripper link is formed as a compound curve through about 180° and may include a flat portion, though it will be appreciated that only a relatively small portion of the curved face engages with the wire in clamping the wire to the flat face 757 of the other gripper link. By releasing the pressure on the release lever 736, the action of the biasing link 720 will cause the gripper links 623 and 624 to return to their closed position, such that the wire 619 is held between the arcuate face 734 and the flat face 757, substantially midway between opposing ends of the channel 756. In this regard, it is believed that this configuration of gripper links will not pinch the wire. The faces may be surface treated, but preferably, the gripper links 623 and 624 are formed from hardened steel, bisalloy 80 or equivalent. The gripper links also do not have the same length, the gripper link with the arcuate face being shorter than the gripper link with the flat face. The flat and arcuate faces are preferably smooth to avoid adversely affecting the surface of the wire to be strained and thereby ameliorating the possibility of corrosion, and provide an 8 mm gap when the jaws are open to allow easy engagement of the wire of one of several between the faces, such wire being typically from 1.6 mm to 4.5 mm gauge. The flat face may be arranged as a cavity of rectangular section between the sides of the channel whereby a wire gripped between the channel and the arcuate face may be bent slightly.

Further, it is believed that the configuration of the handle and the inclusion of the coiled intermediate portion connecting the arms 721 and 722 will provide a gap of 15 mm to 20 mm to prevent the operator jamming their fingers against the arm 722, particularly when releasing the pressure applied to the release lever 736. The operator may then use the drive handle 613 to rotate the drum so as to shorten the length of chain extending from the drum to the strainer post, while checking the tension applied to the strained wire as indicated by the tension indicator 617.

The foregoing description has been given by way of illustrative example of the invention and any modifications and variations which will be apparent to a person skilled in the art may be made without departing from the spirit and scope of the invention as hereinbefore described and defined by the following claims.

The invention claimed is:

1. A wire strainer including:
   drive means comprising a mounting block with a drum mounted for rotation relative thereto and actuation means connected to the drum for selectively causing the drum to rotate relative to the mounting block;
   a line member operatively connected to the drum in a manner such that rotation of the drum in one direction causes the drum to pull the line member relative to the mounting block;
   locking means operatively connected to said mounting block and adapted to selectively lock the drum against rotation in the opposite direction;
   gripping means operatively connected to the mounting block, said gripping means being adapted to be releasably attached to a wire to be strained;
   said fine member including securing means for releasably securing said line member to a strainer post or similar anchor,
   wherein said griping means includes two opposed jaw members connected to each other for pivoting movement relative to each other between an open position in which the wire to be strained can be placed therebetween and a gripping position in which said opposed jaw members grip the wire therebetween; and
   biasing means operatively connected to said jaw members and arranged to bias said jaw members to the gripping position, said biasing means having two elongate portions with spaced apart free ends connected to said opposed jaw members respectively.

2. The wire strainer according to claim 1, wherein said line member is a chain, and said securing means is a hook attached to a link of the chain and adapted to hook around the chain or to the chain to thereby form a closed loop around the strainer post.

3. The wire strainer according to claim 1, wherein said biasing means includes a substantially U or V-shaped spring wire or bar and said two elongate portions are two legs which form said U or V-shape.

4. The wire strainer according to claim 1, wherein said gripping means further includes a release lever extending from one or the other of said jaw members.

5. The wire strainer according to claim 4, wherein at least a portion of said release lever extends generally in the direction of the wire being strained whereby a user may grip said release lever and the wire being strained in one hand.

6. The wire strainer according to claim 1 wherein said locking means and said drum are arranged so that said locking means is operative to lock said drum in any desired one of a plurality of locking positions upon rotation of said drum by said actuation means and wherein the angular difference between adjacent ones of said plurality of locking positions is relatively small.

7. The wire strainer according to claim 1 wherein said gripping means is arranged to swivel. about a longitudinal axis extending generally in the direction of the wire to he strained so as to allow the wire to rotate with said gripping means generally about the longitudinal axis of the wire during straining.

8. The wire strainer according to claim 1 further including a tension indicating device mounted between said drive means and said gripping means.

9. The wire strainer according to claim 8 wherein said tension indicating device includes a spring mounted in a housing such that the spring is operatively connected to the drive means at one end and to the gripping means at the other end.

10. The wire strainer according to claim 1 further including a visual indicator of tension applied to the wire and wherein the visual indicator includes a colour coded plunger.

11. A wire strainer including:
drive means comprising a mounting block with a drum mounted for rotation relative thereto and actuation means connected to the drum for selectively causing the drum to rotate relative to the mounting block, and a line member operatively connected to the drum in a manner Whereby rotation of the drum in one direction causes the drum to pull the line member relative to the mounting block, and locking means operatively connected to said mounting block for selectively locking the drum against rotation in the opposite direction;
gripping means operatively connected to said mounting block and adapted to be releasably attached to a wire to be strained;
wherein said line member includes securing means for releasably securing said line member to a strainer post or similar anchor;
wherein said gripping means includes two opposed jaw members connected to each other for pivoting movement relative to each other between an open position in which the wire to be strained can be placed therebetween and a closed or gripping position in which the wire to-be is gripped between said jaw members, and biasing means operatively connected to said jaw members and arranged to bias said jaw members to the gripping position;
wherein said gripping means further includes a lever extending from one of said jaw members for moving said one jaw member from the closed or gripping position to the open position, and wherein in use at least a portion of said lever extends generally in the intended direction of the wire; and
wherein said biasing means includes two elongate portions with spaced apart free ends connected to said opposed jaw members respectively, said two elongate portions being biased towards each other.

12. The wire strainer according to claim 11, wherein said two elongate portions are formed of spring wire or bar and diverge away from a loop of at least one and a half turns towards their respective free ends.

13. The wire strainer according to claim 12, wherein said elongate portions are substantially symmetrical about a longitudinal axis extending therebetween.

14. The wire strainer according to claim 11, wherein said locking means and said drum are arranged so that said locking means is operative to lock said drum in any desired one of a plurality of locking positions upon rotation of said drum by said actuation means and wherein the angular difference between adjacent ones of said plurality of locking positions is relatively small; and
wherein said gripping means is arranged to swivel about a longitudinal axis extending generally in the direction of the wire to be strained so as to allow the wire to rotate with said gripping means generally about the longitudinal axis of the wire during straining.

15. The wire strainer according to claim 11, wherein the drum includes a drive arrangement having a predetermined minimum arc through which the drum may be rotated and locked and whereby a minimum strain may be put on the wire by movement of said actuation means, the minimum arc being such as to provide a linear straining increment of less than about 6.5 mm.

16. A wire strainer including:
drive means comprising a mounting block with a drum mounted for rotation relative thereto and actuation means connected to the drum for selectively causing the rotary drum to rotate relative to the mounting block, and a line member operatively connected to the drum in a manner whereby rotation of the drum in one direction causes the drum to pull the line member relative to the mounting block, and locking means for selectively locking the drum against rotation in the opposite direction;
gripping means operatively connected to said mounting block and adapted to be releasably attached to a wire to be strained;
said line member including securing means for releasably securing said line member to a strainer post or similar anchor;
wherein said gripping means includes two opposed jaw members connected to each other for pivoting movement relative to each other between an open position in which the wire to be strained can be placed therebetween and a closed or gripping position in which the wire is gripped between said jaw members, biasing means operatively connected to said jaw members and arranged to bias said jaw members to the gripping position, said biasing means having two elongate portions with spaced apart free ends connected to said opposed jaw members respectively, and wherein said gripping means further includes a release lever extending from one or the other of said jaw members and at least a portion of said release lever extending generally in the direction of the wire, whereby a user may grip said release lever and one of said elongate portions in one hand to squeeze said one portion and said release lever together.

17. The wire strainer according to claim 16, wherein said biasing means includes a substantially U or V-shaped spring wire or bar and said two elongate portions are two legs of said spring wire or bar which form said U or V-shape.

18. The wire strainer according to claim 17, wherein said legs diverge away from a loop of about one and a half turns to their respective free ends.

19. The wire strainer according to claim 18, wherein said legs are substantially symmetrical about a longitudinal axis through said loop.

* * * * *